(12) United States Patent
Chae et al.

(10) Patent No.: US 12,155,054 B2
(45) Date of Patent: Nov. 26, 2024

(54) METHOD OF MANUFACTURING NEGATIVE ELECTRODE

(71) Applicant: LG ENERGY SOLUTION, LTD., Seoul (KR)

(72) Inventors: Oh Byong Chae, Daejeon (KR); Yong Ju Lee, Daejeon (KR); Ye Ri Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 483 days.

(21) Appl. No.: 17/621,452

(22) PCT Filed: Jul. 8, 2020

(86) PCT No.: PCT/KR2020/008951
§ 371 (c)(1),
(2) Date: Dec. 21, 2021

(87) PCT Pub. No.: WO2021/006629
PCT Pub. Date: Jan. 14, 2021

(65) Prior Publication Data
US 2022/0352489 A1   Nov. 3, 2022

(30) Foreign Application Priority Data

Jul. 8, 2019   (KR) .................. 10-2019-0081959

(51) Int. Cl.
*H01M 4/04*   (2006.01)
*H01M 4/38*   (2006.01)
(Continued)

(52) U.S. Cl.
CPC ....... *H01M 4/0435* (2013.01); *H01M 4/0416* (2013.01); *H01M 4/0445* (2013.01);
(Continued)

(58) Field of Classification Search
CPC .......... H01M 10/0525; H01M 10/058; H01M 2004/027; H01M 4/0416; H01M 4/0435;
(Continued)

(56) References Cited

U.S. PATENT DOCUMENTS

2005/0130043 A1   6/2005   Gao et al.
2016/0141596 A1   5/2016   Uhm et al.
(Continued)

FOREIGN PATENT DOCUMENTS

CN   109411694 A   3/2019
CN   208722986 U   4/2019
(Continued)

OTHER PUBLICATIONS

Holtstiege et al., "Pre-Lithiation Strategies for Rechargeable Energy Storage Technologies: Concepts, Promises and Challenges", Batteries, 2018, vol. 4, No. 4, pp. 1-39.
(Continued)

*Primary Examiner* — Victoria H Lynch
(74) *Attorney, Agent, or Firm* — Birch, Stewart, Kolasch & Birch, LLP (57) ABSTRACT

Disclosed is a method of manufacturing a negative electrode, wherein a negative electrode structure is electrochemically charged while being pressed with a plurality of pre-lithiation rolls in performing pre-lithiation of the negative electrode structure by a roll-to-roll method, and here, the pressing pressures of the plurality of pre-lithiation rolls are increased in a movement direction of the negative electrode structure. Since the pressing pressures are increased in the movement direction of the negative electrode structure, volume expansion, structural deformation, and damage to an active material due to the pre-lithiation may be prevented, and at the same time, the pre-lithiation (Continued)

may be performed uniformly, and thus it is preferable for improving lifespan characteristics of a negative electrode.

14 Claims, 1 Drawing Sheet

(51) Int. Cl.
*H01M 10/0525* (2010.01)
*H01M 4/02* (2006.01)

(52) U.S. Cl.
CPC ......... *H01M 4/0459* (2013.01); *H01M 4/386* (2013.01); *H01M 10/0525* (2013.01); *H01M 2004/027* (2013.01)

(58) Field of Classification Search
CPC .. H01M 4/0445; H01M 4/0459; H01M 4/139; H01M 4/386; Y02E 60/10
See application file for complete search history.

(56) References Cited

U.S. PATENT DOCUMENTS

| | | |
|---|---|---|
| 2020/0058929 A1 | 2/2020 | Chae et al. |
| 2021/0135274 A1 | 5/2021 | Chae et al. |

FOREIGN PATENT DOCUMENTS

| | | |
|---|---|---|
| JP | 3257877 B2 | 2/2002 |
| JP | 2007-500922 A | 1/2007 |
| KR | 10-0291067 B1 | 6/2001 |
| KR | 10-2015-0014676 A | 2/2015 |
| KR | 10-1594784 B1 | 2/2016 |
| KR | 10-2018-0112659 A | 10/2018 |
| KR | 10-2019-0017149 A | 2/2019 |

OTHER PUBLICATIONS

International Search Report (PCT/ISA/210) issued in PCT/KR2020/008951 mailed on Oct. 19, 2020.

METHOD OF MANUFACTURING NEGATIVE ELECTRODE

CROSS-REFERENCE TO RELATED APPLICATION

This application claims priority to and the benefit of Korean Patent Application No. 10-2019-0081959, filed on Jul. 8, 2019, the disclosure of which is incorporated herein by reference in its entirety.

TECHNICAL FIELD

The present invention relates to a method of manufacturing a negative electrode.

BACKGROUND ART

Recently, with the rapid spread of electronic devices using batteries, such as a mobile phone, a notebook computer, an electric vehicle, and the like, the demand for a secondary battery that is small in size and light in weight but has a relatively high capacity is rapidly increasing. In particular, lithium secondary batteries are light in weight and have a high energy density, and thus are receiving the spotlight as a driving power source for portable devices. Accordingly, efforts on research and development for improving the performance of the lithium secondary battery have been actively made.

The lithium secondary battery generally includes a positive electrode, a negative electrode, a separator interposed between the positive electrode and the negative electrode, an electrolyte, an organic solvent, and the like. In addition, in the positive electrode and the negative electrode, an active material layer including a positive electrode active material or a negative electrode active material may be formed on a current collector. In general, a lithium-containing metal oxide such as $LiCoO_2$, $LiMn_2O_4$, or the like is used as a positive electrode active material in the positive electrode, and a carbon-based material or a silicon-based material which does not contain lithium is used as a negative electrode active material in the negative electrode.

In the case of such a negative electrode, a passivation film such as a solid electrolyte interface layer (SEI layer) is formed on the surface of the negative electrode during initial charging. In addition, since the passivation film interferes with the insertion of an organic solvent into the negative electrode and suppresses the decomposition reaction of an organic solvent, a negative electrode structure is stabilized, the reversibility of the negative electrode is improved, and the negative electrode structure enables use as the negative electrode. However, the formation reaction of the passivation film, which is an irreversible reaction, leads to the consumption of lithium ions, resulting in reduced battery capacity, and as lithium ions are consumed while the battery cycle of the battery is repeated, capacity and cycle lifespan are deteriorated.

Accordingly, a method of pre-lithiating a negative electrode by intercalating lithium into the negative electrode to promote the pre-formation of a passivation film on the surface of the negative electrode, the prevention of capacity degradation, and the improvement of cycle life has been developed.

As an example of the pre-lithiation method, there is a method of introducing a negative electrode structure into a lithium salt-containing solution and electrochemically charging the negative electrode structure using a lithium metal as a counter electrode. However, in the case of the method, the negative electrode structure and the lithium metal need to be spaced by a predetermined distance to prevent an electrical short circuit, and accordingly, problems arise in that the distance and resistance required for lithium ions to be intercalated into the negative electrode structure are increased and the negative electrode structure is not uniformly pre-lithiated with lithium ions.

Accordingly, there is a need for the development of a method of uniformly pre-lithiating a negative electrode while achieving the purpose of pre-lithiation.

Korean Registered Patent No. 10-0291067 discloses a method of pre-lithiating a carbon electrode and a method of manufacturing a lithium secondary battery using the same.

PRIOR ART DOCUMENT

Patent Document

Korean Registered Patent No. 10-0291067

DISCLOSURE

Technical Problem

The present invention is directed to providing a method of manufacturing a negative electrode, which is capable of preventing volume expansion, structural deformation, and damage to an active material caused by pre-lithiation, uniformly performing the pre-lithiation, and improving lifespan characteristics of the negative electrode by pressing and electrochemically charging a negative electrode structure with a plurality of pre-lithiation rolls and increasing the pressing pressure of the pre-lithiation rolls as the negative electrode structure moves in the pre-lithiation of the negative electrode structure, in a roll-to-roll manner.

Technical Solution

One aspect of the present invention provides a method of manufacturing a negative electrode of the present invention which includes preparing a negative electrode roll on which a negative electrode structure is wound, wherein the negative electrode structure comprising a negative electrode current collector and a negative electrode active material layer formed on at least one surface of the negative electrode current collector, preparing a pre-lithiation bath comprising a pre-lithiation solution, wherein the pre-lithiation bath is sequentially partitioned into an impregnation section, a pre-lithiation section, and an aging section, impregnating the negative electrode structure with the pre-lithiation solution while unwinding the negative electrode structure from the negative electrode roll and moving the negative electrode structure through the impregnation section, pre-lithiating the negative electrode structure while moving the negative electrode structure out of the impregnation section and moving the negative electrode structure through the pre-lithiation section, and aging the negative electrode structure while moving the negative electrode structure out of the pre-lithiation section and moving the negative electrode structure through the aging section, wherein the pre-lithiating of the negative electrode structure comprises: (a) arranging a plurality of pre-lithiation rolls, wherein each roll is rotatable and comprises a core, a lithium metal layer formed on the core, and a separator layer formed on the lithium metal layer, in the pre-lithiation section in a movement direction of the negative electrode structure and (b) pre-lithiating the negative electrode structure by electrochemically charging the negative electrode structure while moving the negative electrode structure through the pre-lithiation section, wherein the negative electrode active material layer is in contact with the plurality of pre-lithiation rolls and pressing the negative electrode structure with the plurality of pre-lithiation rolls, and wherein the pressing pressures of the pre-lithiation rolls in contact with the negative electrode structure are increased as the negative electrode structure moves.

Advantageous Effects

According to a method of manufacturing a negative electrode of the present invention, a negative electrode structure is electrochemically charged while being pressed with a plurality of pre-lithiation rolls in performing pre-lithiation of the negative electrode structure by a roll-to-roll method, and here, the pressing pressures of the plurality of pre-lithiation rolls are increased in a movement direction of the negative electrode structure. According to the present invention, since the pressing pressures are increased in the movement direction of the negative electrode structure, volume expansion, structural deformation, and damage to an active material due to the pre-lithiation can be prevented, and at the same time, the pre-lithiation can be performed uniformly, and thus it is preferable for improving lifespan characteristics of a negative electrode.

MODES OF THE INVENTION

Figure 1:
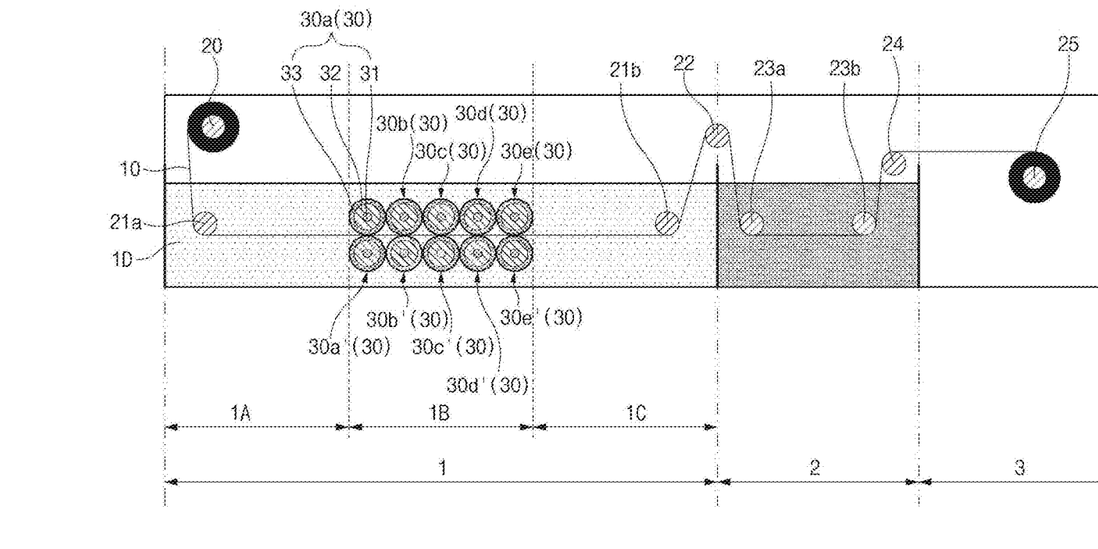
The FIGURE is a schematic view for describing a method of manufacturing a negative electrode of the present invention.

The terms or words used in the present specification and claims should not be construed as being limited to ordinary or dictionary meanings and should be construed as meanings and concepts consistent with the spirit of the present invention based on the principle that an inventor can appropriately define concepts and terms to explain the invention of the inventor in the best way.

The terms used in the present specification are only used to describe specific various embodiments and are not intended to limit the present invention. As used herein, singular forms are intended to include plural forms as well, unless the context clearly indicates otherwise.

It should be understood that the terms "comprising", "including", "containing", and/or "having", when used herein, specify the presence of stated features, integers, steps, operations, elements, components and/or combinations thereof, but do not preclude the presence or addition of one or more other features, integers, steps, operations, elements, components and/or combinations thereof.

In the present specification, an average particle diameter ($D_{50}$) may be defined as a particle diameter corresponding to 50% in a cumulative volume-based particle diameter distribution curve. The average particle diameter ($D_{50}$) may be measured using a laser diffraction method. The laser diffraction method may be used to measure a particle diameter in the range from submicrons to several micrometers, and may obtain results with high reproducibility and high resolution.

Hereinafter, the present invention will be described in detail.

<Method of Manufacturing Negative Electrode>

The present invention relates to a method of manufacturing a negative electrode, and specifically, to a method of manufacturing a negative electrode for a lithium secondary battery.

A method of manufacturing a negative electrode of the present invention includes: preparing a negative electrode roll on which a negative electrode structure is wound, wherein the negative electrode structure comprising a negative electrode current collector and a negative electrode active material layer formed on at least one surface of the negative electrode current collector; preparing a pre-lithiation bath comprising a pre-lithiation solution, wherein the pre-lithiation bath is sequentially partitioned into an impregnation section, a pre-lithiation section, and an aging section; impregnating the negative electrode structure with the pre-lithiation solution while unwinding the negative electrode structure from the negative electrode roll and moving the negative electrode structure through the impregnation section; pre-lithiating the negative electrode structure while moving the negative electrode structure out of the impregnation section and moving the negative electrode structure through the pre-lithiation section; and aging the negative electrode structure while moving the negative electrode structure out of the pre-lithiation section and moving the negative electrode structure through the aging section, wherein the pre-lithiating of the negative electrode structure comprises (a) arranging a plurality of pre-lithiation rolls, wherein each roll is rotatable and comprises a core, a lithium metal layer formed on the core, and a separator layer formed on the lithium metal layer, in the pre-lithiation section in a movement direction of the negative electrode structure and (b) pre-lithiating the negative electrode structure by electrochemically charging the negative electrode structure while moving the negative electrode structure through the pre-lithiation section, wherein the negative electrode active material layer is in contact with the plurality of pre-lithiation rolls and pressing the negative electrode structure with the plurality of pre-lithiation rolls, and wherein the pressing pressures of the pre-lithiation rolls in contact with the negative electrode structure are increased as the negative electrode structure moves.

Hereinafter, the method of manufacturing a negative electrode of the present invention will be described in detail with reference to the accompanying drawing. In adding reference numerals to elements in each drawing, the same elements will be designated by the same reference numerals when possible, even if they are shown in different drawings. Further, in the following description of the present invention, a detailed description of known configurations or functions incorporated herein will be omitted when it is determined that the description may make the subject matter of the present invention rather unclear.

The FIGURE is a schematic view for describing a method of manufacturing a negative electrode of the present invention.

Referring to the FIGURE, the method of manufacturing a negative electrode according to the present invention includes preparing a negative electrode roll 20 on which a negative electrode structure 10 including a negative electrode current collector and a negative electrode active material layer formed on at least one surface of the negative electrode current collector is wound.

According to the method of manufacturing a negative electrode of the present invention, a pre-lithiation process is performed by unwinding the negative electrode structure 10 from the negative electrode roll 20 on which the negative electrode structure 10 is wound, introducing the negative electrode structure 10 into a pre-lithiation bath 1 to be described below, and moving the negative electrode structure 10 through the pre-lithiation bath 1. That is, the method of manufacturing a negative electrode of the present invention is for manufacturing a negative electrode in a roll-to-roll manner and has an advantage of improvements in processability and quality consistency of a product because processes such as electrolyte solution impregnation, pre-lithiation, and the like may be performed at one time as the negative electrode structure moves.

The negative electrode structure 10 is wound on the negative electrode roll 20 and includes a negative electrode current collector and a negative electrode active material layer formed on at least one surface of the negative electrode current collector.

The negative electrode roll 20 may be used without limitation as long as it allows the negative electrode structure to be wound/unwound thereon/therefrom and is typically used in a roll-to-roll process.

The negative electrode current collector is not particularly limited as long as it has high conductivity without causing chemical changes in the battery. Specifically, as the negative electrode current collector, copper, stainless steel, aluminum, nickel, titanium, calcined carbon, copper or stainless steel whose surface has been treated with carbon, nickel, titanium, silver, or the like, an aluminum-cadmium alloy, or the like may be used.

The negative electrode current collector may generally have a thickness of 3 μm to 500 μm.

The negative electrode current collector may have fine irregularities formed on a surface thereof to increase the binding force of a negative electrode active material. For example, the negative electrode current collector may be used in various forms such as a film, a sheet, a foil, a net, a porous body, a foamed body, a non-woven fabric, and the like.

The negative electrode active material layer is formed on at least one surface of the negative electrode current collector. Specifically, the negative electrode active material layer may be formed on one surface or both surfaces of the negative electrode current collector and is preferably formed on both surfaces of the negative electrode current collector in view of the utilization of the negative electrode active material and the improvement of cell energy density.

The negative electrode active material layer includes a negative electrode active material.

The negative electrode active material may include at least one selected from the group consisting of a carbon-based active material and a silicon-based active material.

The silicon-based active material may impart excellent capacity characteristics and excellent durability to the negative electrode or the secondary battery of the present invention.

The silicon-based active material may include a compound represented by $SiO_x$ ($0 \leq x < 2$). Since $SiO_2$ may not react with lithium ions and thus not store lithium, x is preferably within the above range, and more preferably, the silicon-based oxide may be $SiO_x$.

The silicon-based active material may have an average particle diameter ($D_{50}$) of 1 μm to 30 μm, and preferably, 3 μm to 15 μm in view of providing structural stability and reducing side reactions with an electrolyte solution during charging and discharging.

The carbon-based active material may impart excellent cycle characteristics or excellent battery lifespan characteristics to the negative electrode or the secondary battery of the present invention.

Specifically, the carbon-based active material may include at least one selected from the group consisting of artificial graphite, natural graphite, hard carbon, soft carbon, carbon black, acetylene black, Ketjen black, Super P, graphene, and fibrous carbon and preferably includes at least one selected from the group consisting of artificial graphite and natural graphite.

The carbon-based active material may have an average particle diameter ($D_{50}$) of 10 μm to 30 μm, and preferably, 15 μm to 25 μm in view of providing structural stability and reducing side reactions with an electrolyte during charging and discharging.

Specifically, the negative electrode active material preferably includes both the silicon-based active material and the carbon-based active material in view of simultaneously improving capacity characteristics and cycle characteristics, and in more detail, the negative electrode active material preferably includes the carbon-based active material and the silicon-based active material in a weight ratio of 50:50 to 95:5, and more preferably, in a weight ratio of 60:40 to 80:20. A weight ratio in the above range is preferable in view of simultaneously improving capacity characteristics and cycle characteristics.

The negative electrode active material may be included in an amount of 60 wt % to 99 wt %, and preferably, 75 wt % to 95 wt % in the negative electrode active material layer.

The negative electrode active material layer may further include a binder and/or a conductive material in addition to the negative electrode active material.

The binder is used to improve the performance of a battery by improving the adhesion between the negative electrode active material layer and the negative electrode current collector, and may be, for example, at least one selected from the group consisting of a polyvinylidene fluoride-hexafluoropropylene copolymer (PVDF-co-HFP), polyvinylidene fluoride (PVDF), polyacrylonitrile, polymethylmethacrylate, polyvinyl alcohol, carboxymethylcellulose (CMC), starch, hydroxypropylcellulose, regenerated cellulose, polyvinylpyrrolidone, polytetrafluoroethylene, polyethylene, a propylene polymer, polyacrylic acid, an ethylene-propylene-diene monomer (EPDM), a sulfonated EPDM, styrene butadiene rubber (SBR), fluorine rubber, and the above-mentioned materials whose hydrogen is substituted with Li, Na or Ca, or various copolymers thereof.

The binder may be included in an amount of 0.5 wt % to 10 wt %, and preferably, 1 wt % to 5 wt % in the negative electrode active material layer.

The conductive material is not particularly limited as long as it has conductivity without causing chemical changes in the battery, and for example, graphite such as natural graphite or artificial graphite; a carbon-based material such as carbon black, acetylene black, Ketjen black, channel black, furnace black, lamp black or thermal black; a conductive fiber such as a carbon fiber or a metal fiber; a conductive tube such as a carbon nanotube; fluorocarbon powder; a metal powder such as aluminum powder or nickel powder; a conductive whisker consisting of zinc oxide or potassium titanate; a conductive metal oxide such as titanium oxide; or a conductive material such as a polyphenylene derivative may be used.

The conductive material may be included in an amount of 0.5 wt % to 10 wt %, preferably 1 wt % to 5 wt % in the negative electrode active material layer based on the total weight of the negative electrode active material layer.

The negative electrode active material layer may have a thickness of 10 μm to 100 μm, and preferably, 50 μm to 80 μm.

The method of manufacturing a negative electrode according to the present invention includes preparing a pre-lithiation bath 1 which is sequentially partitioned into an impregnation section 1A, a pre-lithiation section 1B, and an aging section 1C and contains a pre-lithiation solution 1D.

The pre-lithiation bath 1 may be provided as a place in which the negative electrode structure 10 unwound from the negative electrode roll 20 may be impregnated with an electrolyte solution, pre-lithiated, and aged while moving in the pre-lithiation bath.

The size and shape of the pre-lithiation bath 1 may be appropriately designed in consideration of the degrees of the impregnation, pre-lithiation, and aging of the negative electrode structure and the movement distance of the negative electrode structure according to roll-to-roll processing, or the like. Specifically, the ratio of lengths of the impregnation section 1A, the pre-lithiation section 1B, and the aging section 1C may be 1 or 10:1:1 to 20, and preferably, 1.5 to 5:1:2 to 10 in order to smoothly perform pre-lithiation.

The pre-lithiation bath 1 contains the pre-lithiation solution 1D. The pre-lithiation bath 1 is at least partially filled with the pre-lithiation solution 1D, and the negative electrode structure 10 unwound from the negative electrode roll 20 is introduced into the pre-lithiation solution 1D and moves through each of the sections of the pre-lithiation bath 1.

The pre-lithiation solution 1D may include a lithium salt and an organic solvent.

The organic solvent is not particularly limited as long as it may serve to carry out an electrochemical reaction and perform a role of a medium enabling the movement of ions, and specifically, may include ester-based solvents such as methyl acetate, ethyl acetate, γ-butyrolactone, and ε-caprolactone; ether-based solvents such as dibutyl ether and tetrahydrofuran; ketone-based solvents such as cyclohexanone; aromatic hydrocarbon-based solvents such as benzene and fluorobenzene; carbonate-based solvents such as dimethyl carbonate (DMC), diethyl carbonate (DEC), methyl ethyl carbonate (MEC), ethyl methyl carbonate (EMC), ethylene carbonate (EC), and propylene carbonate (PC); alcohol-based solvents such as ethyl alcohol and isopropyl alcohol; nitriles such as R—CN (R is a straight, branched, or cyclic C2 to C20 hydrocarbon group and may include a double-bonded aromatic ring or an ether bond); amides such as dimethylformamide; dioxolanes such as 1,3-dioxolane; sulfolanes; and the like. Among these, a carbonate-based solvent is preferred, and EMC, EC, or the like is more preferred in view of improving electrochemical stability.

The lithium salt may include at least one selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$ and preferably includes $LiPF_6$.

A concentration of the lithium salt may be in a range of 0.1 M to 3 M, and preferably, 0.5 M to 1.5 M based on the pre-lithiation solution, and a concentration in this range is preferable since the lithium salt may be sufficiently dissolved so that lithium ions may be smoothly intercalated into an active material.

In view of stabilizing the surface of a negative electrode active material during pre-lithiation so the pre-lithiation is smoothly performed, the pre-lithiation solution 1D may further include at least one additive selected from the group consisting of fluoroethylene carbonate (FEC), vinylene carbonate (VC), polystyrene (PS), succinonitrile, ethylene glycol bis(propionitrile) ether, and lithium bis(fluorosulfonyl) imide (LiFSI), and preferably, an additive including FEC.

The additive may be included in an amount of 0.1 wt % to 15 wt %, and preferably, 0.5 wt % to 5 wt % in the pre-lithiation solution based on the total weight of the pre-lithiation solution in view of stabilizing the surface of a negative electrode active material in order to smoothly perform pre-lithiation.

The pre-lithiation bath 1 is sequentially partitioned into the impregnation section 1A, the pre-lithiation section 1B, and the aging section 1C. The impregnation section 1A, the pre-lithiation section 1B, and the aging section 1C are not partitioned in a closed manner in the pre-lithiation bath 1 but abstractly partitioned according to the position of the negative electrode structure in the pre-lithiation bath and the process performed at the position of the negative electrode structure. For example, as shown in the FIGURE, the impregnation section 1A, the pre-lithiation section 1B, and the aging section 1C are abstractly partitioned through dotted lines in the pre-lithiation bath 1.

As the pre-lithiation bath 1 contains the pre-lithiation solution 1D, the pre-lithiation solution 1D is also contained in the impregnation section 1A, the pre-lithiation section 1B, and the aging section 1C which are partitioned in the pre-lithiation bath 1.

In the impregnation section 1A, the pre-lithiation section 1B, and the aging section 1C, one or more fixed rolls 21a and 21b may be disposed so that the negative electrode structure 10 unwound from the negative electrode roll 20 may smoothly move through each of the sections 1A, 1B, and 1C. The fixed rolls 21a and 21b are fixedly disposed in the pre-lithiation bath 1, and the unwound negative electrode structure 10 may move through each of the sections in the pre-lithiation bath 1 along the fixed rolls 21a and 21b. Specifically, as illustrated in the FIGURE, the one or more fixed rolls 21a and 21b may be disposed at both ends of the pre-lithiation bath 1.

The size or length of each of the impregnation section 1A, the pre-lithiation section 1B, and the aging section 1C may be appropriately designed in consideration of the degrees of electrolyte solution impregnation, pre-lithiation, and aging of the negative electrode structure 10.

A temperature of the pre-lithiation bath 1 or the pre-lithiation solution 1D may be in a range of 10° C. to 80° C., preferably, 20° C. to 60° C., and more preferably, 25° C. to 40° C., and when a temperature is within this range, a negative electrode may be pre-lithiated smoothly, and lithium ions may diffuse smoothly into the negative electrode structure.

The method of manufacturing a negative electrode of the present invention includes impregnating the negative electrode structure 10 with the pre-lithiation solution 1D while unwinding the negative electrode structure 10 from the negative electrode roll 20 and moving the negative electrode structure 10 through the impregnation section 1A.

The negative electrode structure 10 unwound from the negative electrode roll 20 is introduced into the pre-lithiation bath 1 and moves through the impregnation section 1A. Specifically, the negative electrode structure 10 unwound from the negative electrode roll 20 may move through the impregnation section 1A along the fixed rolls 21a and 21b.

As the negative electrode structure 10 moves through the impregnation section 1A, electrolyte solution impregnation is achieved with the pre-lithiation solution 1D in the impregnation section 1A. Due to the electrolyte solution impregnation, lithium ions may be more smoothly intercalated in the pre-lithiation of the negative electrode structure 10.

The time taken for the negative electrode structure 10 to move through the impregnation section 1A is 1 times to 10 times, and preferably, 1.5 times to 5 times the time taken for the negative electrode structure 10 to move through the pre-lithiation section 1B, and when a time is within the above-described range, it is possible to form a passivation film more uniformly in pre-lithiation to be described below and perform the pre-lithiation.

The method of manufacturing a negative electrode of the present invention includes pre-lithiating the negative electrode structure 10 while moving the negative electrode structure out of the impregnation section 1A and moving the negative electrode structure through the pre-lithiation section 1B.

The negative electrode structure 10 passes through the impregnation section 1A and enters the pre-lithiation section 1B, and in the pre-lithiation section 1B, the negative electrode structure 10 is pre-lithiated, and lithium ions are intercalated into the negative electrode active material layer or negative electrode active material, and accordingly, the irreversible capacity of the negative electrode active material is removed, and a passivation film is formed.

While the negative electrode structure 10 moves through the pre-lithiation section 1B, the pre-lithiation is simultaneously performed.

The time taken for the negative electrode structure 10 to move through the pre-lithiation section 1B may be in a range of 5 minutes to 120 minutes, preferably, 10 minutes to 90 minutes, and more preferably, 15 minutes to 40 minutes, and a time in this range is preferable in view of the fact that the negative electrode active material may be more uniformly pre-lithiated and an increase in side reaction products in a negative electrode due to excessive pre-lithiation may be prevented.

The pre-lithiating of the negative electrode structure includes (a) arranging a plurality of pre-lithiation rolls 30, each of which is rotatable and includes a core 31, a lithium metal layer 32 formed on the core 31, and a separator layer 33 formed on the lithium metal layer 32, in the pre-lithiation section 1B in a movement direction of the negative electrode structure 10 and (b) pre-lithiating the negative electrode structure 10 by electrochemically charging the negative electrode structure 10 while moving the negative electrode structure 10 through the pre-lithiation section 1B such that the negative electrode active material layer is in contact with the plurality of pre-lithiation rolls 30 and pressing the negative electrode structure 10 with the plurality of pre-lithiation rolls 30. In addition, the pre-lithiating of the negative electrode structure is performed by a method of increasing the pressing pressures of the pre-lithiation rolls 30 in contact with the negative electrode structure as the negative electrode structure 10 moves.

The pre-lithiating of the negative electrode structure is performed by a method including (a) arranging the plurality of pre-lithiation rolls 30, each of which is rotatable and includes the core 31, the lithium metal layer 32 formed on the core 31, and the separator layer 33 formed on the lithium metal layer 32, in the pre-lithiation section 1B in the movement direction of the negative electrode structure 10.

Each of the pre-lithiation rolls 30 includes the core 31, the lithium metal layer 32 formed on the core 31, and the separator layer 33 formed on the lithium metal layer 32.

A rotating means configured to rotate the pre-lithiation roll 30 may be coupled to the core 31, and the pre-lithiation roll 30 may rotate as the core 31 rotates.

The core 31 may include at least one selected from the group consisting of copper, stainless steel, aluminum, nickel, titanium, and calcined carbon and may preferably include stainless steel in view of low reactivity and high stability at high voltage and low voltage and economic feasibility.

The lithium metal layer 32 may be provided as a counter electrode for the negative electrode structure in performing the pre-lithiation, and may function as a lithium source that transfers lithium ions into the negative electrode structure when the pre-lithiation is performed by electrochemically charging the negative electrode structure.

A thickness of the lithium metal layer 32 may be appropriately designed in consideration of the degree of pre-lithiation of the negative electrode active material and, specifically, may be in a range of 20 μm to 400 μm, and preferably, 50 μm to 200 μm.

The separator layer 33 may prevent a phenomenon, in which electrodes are short-circuited, that may occur when the negative electrode structure 10 is brought into direct contact with the lithium metal layer 32 while being pressed and electrochemically charged and also prevent a problem in which the intercalation rate of lithium into the negative electrode structure 10 is not controlled when the negative electrode structure 10 is brought into direct contact with the lithium metal layer 32.

As the separator layer 33, a separator layer that exhibits low resistance to the migration of lithium ions and has an excellent electrolyte solution impregnation ability is preferred. Specifically, the separator layer may include: a porous polymer film including at least one selected from the group consisting of an ethylene polymer, a propylene polymer, an ethylene/butene copolymer, an ethylene/hexene copolymer, an ethylene/methacrylate copolymer, and an olefin-based polymer; a porous non-woven fabric including at least one selected from the group consisting of high-melting-point glass fiber and polyethylene terephthalate fiber; or a combination of two or more thereof. The separator layer preferably includes a porous polymer film and more preferably includes a propylene polymer in view of ensuring mechanical stability and chemical stability.

The separator layer 33 may have a thickness of 5 to 30 μm, and preferably, 8 to 20 μm in view of smooth intercalation/diffusion of lithium into/in the negative electrode structure and uniform pre-lithiation.

A diameter of the pre-lithiation roll 30 may be in a range of 2.5 cm to 20 cm, and preferably, 5 cm to 12 cm, and a diameter in this range is preferable in view of the easy design of a pre-lithiation apparatus.

The plurality of pre-lithiation rolls 30 are disposed in the movement direction of the negative electrode structure 10. For example, since the pre-lithiation rolls 30 are arranged to be in contact with the negative electrode active material layer, and the negative electrode active material layer is arranged on one surface or both surfaces of the negative electrode current collector, a plurality of pre-lithiation rolls may be arranged on one surface or both surfaces of the negative electrode structure. For example, as illustrated in the FIGURE, a plurality of pre-lithiation rolls 30a, 30b, 30c, 30d, and 30e may be arranged on one surface of the negative electrode structure 10 in the movement direction of the negative electrode structure 10, and a plurality of pre-lithiation rolls 30a', 30b', 30c', 30d', and 30e' may be arranged on the other surface of the negative electrode structure 10 in the movement direction of the negative electrode structure 10. In the FIGURE, the pre-lithiation rolls 30a, 30b, 30c, 30d, 30e, 30a', 30b', 30c', 30d', and 30e' may each include the core 31, the lithium metal layer 32, and the separator layer 33 that are described above. The number of the pre-lithiation rolls 30 is not particularly limited, and may be appropriately determined in consideration of the length or the like of the pre-lithiation section.

The pre-lithiation roll 30 is rotatable and, in particular, may rotate as the negative electrode structure 10 moves through the pre-lithiation section. Accordingly, when the pre-lithiation roll 30 presses the negative electrode structure 10, a linear pressure other than a surface pressure may be applied to the negative electrode structure 10, and the negative electrode structure may be pressed and pre-lithiated to a uniform level compared to the case in which a surface pressure is applied to a negative electrode structure by a lithium source having a plate shape.

The pre-lithiating of the negative electrode structure includes (b) pre-lithiating the negative electrode structure 10 by electrochemically charging the negative electrode structure 10 while moving the negative electrode structure 10 through the pre-lithiation section 1B such that the negative electrode active material layer is in contact with the plurality of pre-lithiation rolls 30 and pressing the negative electrode structure 10 with the plurality of pre-lithiation rolls 30. In addition, and the pre-lithiating of the negative electrode structure is performed by a method of increasing the pressing pressures of the pre-lithiation rolls 30 in contact with the negative electrode structure as the negative electrode structure 10 moves.

According to the method of manufacturing a negative electrode of the present invention, a negative electrode structure is simultaneously pre-lithiated while being pressed with a plurality of pre-lithiation rolls in performing the pre-lithiation in a roll-to-roll manner. Accordingly, even when lithium is intercalated into the negative electrode structure or negative electrode active materials through the pre-lithiation, the distance between the negative electrode active materials may be maintained, volume expansion or structural deformation of the negative electrode structure may be prevented, and the uniformity of the pre-lithiation may be improved. Thus, a negative electrode manufactured by the method of manufacturing a negative electrode of the present invention may be prevented from having increased resistance and may exhibit an excellent capacity retention rate and improved cycle characteristics.

Further, the method of manufacturing a negative electrode of the present invention is performed by a method of arranging a plurality of pre-lithiation rolls in a movement direction of a negative electrode structure and increasing the pressing pressures of the pre-lithiation rolls in contact with the negative electrode structure as the negative electrode structure moves. For example, when the negative electrode structure enters a pre-lithiation section, the pre-lithiation roll in contact with the negative electrode structure presses the negative electrode structure with a relatively low pressing pressure, and the pressing pressures of the pre-lithiation rolls in contact with the negative electrode structure may be proportionally increased as the negative electrode structure moves through the pre-lithiation section. In the case that the negative electrode structure is electrochemically charged while being pressed under high pressure when entering the pre-lithiation section, an active material may be structurally damaged, but, according to the present invention, the structural deformation of the negative electrode structure and the damage to the active material may be prevented while achieving uniform pre-lithiation, which is advantageous for improving the lifespan characteristics of the negative electrode.

Further, the method of manufacturing a negative electrode of the present invention is preferred in that an electrolyte solution impregnation process in an impregnation section and a pre-lithiation process in a pre-lithiation section may be continuously performed, and thus processability in manufacturing a product and quality consistency of the product may be improved.

The pressing pressures of the plurality of pre-lithiation rolls may be in a range of 5 kg/cm to 1,600 kg/cm, preferably, 10 kg/cm to 850 kg/cm, and more preferably, 25 kg/cm to 300 kg/cm. When the pressing pressures are within the above-described range, the volume expansion of the negative electrode caused by the pre-lithiation may be sufficiently suppressed, and at the same time, the negative electrode active material may be prevented from collapsing or being damaged due to excessive pressure.

When the negative electrode structure enters the pre-lithiation section, the pressing pressures of the pre-lithiation rolls may be in a range of 5 kg/cm to 180 kg/cm, and preferably, 25 kg/cm to 80 kg/cm, and when the negative electrode structure is passing through the pre-lithiation section, the pressing pressures of the pre-lithiation rolls may be in a range of 40 kg/cm to 1,600 kg/cm, preferably, 100 kg/cm to 850 kg/cm, and more preferably, 150 kg/cm to 300 kg/cm. When the pressing pressures are within the above-described range, the pre-lithiation may be sufficiently performed without damaging the active material when the negative electrode structure enters the pre-lithiation section, and the volume expansion of the negative electrode active material, which occurs when the pre-lithiation is performed while the negative electrode structure moves through the pre-lithiation section, may be smoothly suppressed as the pressing pressures are increased.

The differences between the pressing pressures of the pre-lithiation rolls when the negative electrode structure enters the pre-lithiation section and the pressing pressures of the pre-lithiation rolls when the negative electrode structure is passing through the pre-lithiation section may be in a range of 15 kg/cm to 1,500 kg/cm, preferably, 130 kg/cm to 500 kg/cm, and more preferably, 150 kg/cm to 190 kg/cm. When the differences between the pressing pressures are within the above-described range, the pre-lithiation may be sufficiently performed without damaging the active material when the negative electrode structure enters the pre-lithiation section, and the volume expansion of the negative electrode active material, which occurs when the pre-lithiation is performed while the negative electrode structure moves through the pre-lithiation section, may be smoothly suppressed as the pressing pressures are increased.

According to the present invention, the pressing pressures of the pre-lithiation rolls in contact with the negative electrode structure may be proportionally increased as the negative electrode structure moves. In the pressing pressures of the plurality of pre-lithiation rolls arranged in the pre-lithiation section, when the negative electrode structure enters the pre-lithiation section, the pressing pressure of the pre-lithiation roll in contact with the negative electrode structure is controlled to be the lowest, and then the pressing pressures of the pre-lithiation rolls may be increased proportionally as the negative electrode structure moves through the pre-lithiation section, and when the negative electrode structure is passing through the pre-lithiation section, the pressing pressure of the pre-lithiation roll in contact with the negative electrode structure is controlled to be the greatest. Due to the proportional increase in the pressing pressures of the plurality of pre-lithiation rolls, the negative electrode structure may be smoothly and stably pre-lithiated without generating damage.

The electrochemical charging may be performed by an oxidation-reduction reaction of the pressed negative electrode structure 10 using an electrochemical charging and discharging device. The lithium metal layer 32 in the pre-lithiation roll 30 may function as a counter electrode for the negative electrode structure 10.

The electrochemical charging may be performed at a current density of 0.2 mA/cm$^2$ to 10 mA/cm$^2$, and preferably, 2 mA/cm$^2$ to 6 mA/cm$^2$, and when the negative electrode structure is electrochemically charged with a current density within the above-described range, the negative electrode active material may be stably and uniformly pre-lithiated.

The pre-lithiation may be performed by electrochemically charging the negative electrode structure to 5 to 50%, preferably, 15 to 35% of the state of charge (SoC) of the negative electrode structure. It is preferred that the pre-lithiation is performed by electrochemically charging the negative electrode structure within the above-described range in that a passivation film may be uniformly and stably formed on the surface of the negative electrode structure and thus the reversible capacity of a battery may be improved, so that the cycle characteristics of the battery may be improved.

The method of manufacturing a negative electrode of the present invention includes aging the negative electrode structure 10 while moving the negative electrode structure 10 out of the pre-lithiation section 1B and moving the negative electrode structure 10 through the aging section 1C.

As the negative electrode structure 10 moves out of the pre-lithiation section 1B, the negative electrode structure enters the aging section 1C.

As the pre-lithiated negative electrode structure moves through the aging section 1C containing the pre-lithiation solution 1D, lithium ions intercalated by the pre-lithiation may be more uniformly diffused on the surface and in the inside of the negative electrode active material. When the aging process is not performed after the pre-lithiation, it is not preferable because lithium ions may not be uniformly diffused into the negative electrode active material, and thus it may be difficult to sufficiently remove the irreversible capacity even though the pre-lithiation has been performed, and charging and discharging may not uniformly occur after a negative electrode is manufactured.

The time taken for the negative electrode structure 10 to move through the aging section 1C is 0.5 times to 21 times, preferably, and 1.8 times to 10 times the time taken for the negative electrode structure 10 to move through the pre-lithiation section 1B. A time in the above-described range is preferable since lithium ions may be more uniformly diffused into the negative electrode active material, and phenomena in which the negative electrode active material layer is detached from the current collector due to excessive aging and resistance is increased due to an increase in the thickness of a surface coating of a negative electrode may be prevented.

The method of manufacturing a negative electrode of the present invention may further include washing the aged negative electrode structure 10 by taking the aged negative electrode structure 10 out of the pre-lithiation bath 1, introducing the aged negative electrode structure 10 into a washing bath 2 containing an organic solvent, and moving the aged negative electrode structure 10 through the washing bath 2.

Since the method of manufacturing a negative electrode of the present invention further includes the washing process after the pre-lithiation and aging of the negative electrode structure 10, impurities remaining in the negative electrode structure may be removed.

The washing process may be performed by taking the aged negative electrode structure 10 out of the pre-lithiation bath 1 and introducing the aged negative electrode structure 10 into the separately provided washing bath 2.

The washing process may be performed by discharging the aged negative electrode structure 10 from the pre-lithiation bath 1 and introducing the aged negative electrode structure 10 into the washing bath 2 through a fixed roll 22 disposed between the pre-lithiation bath 1 and the washing bath 2, and the aged negative electrode structure 10 may be washed while moving through the washing bath 2. The movement of the negative electrode structure 10 in the washing bath 2 may be performed by separately provided fixed rolls 23a and 23b.

The washing bath 2 contains the organic solvent, specifically, the organic solvent not containing a lithium salt. The washing process is performed while moving the aged negative electrode structure in the solution not containing a lithium salt. As the organic solvent, the organic solvent listed in the description of the pre-lithiation solution may be used.

The time taken for the aged negative electrode structure 10 to move through the washing bath 2 is 0.1 times to 5 times, and preferably, 0.5 times to 2 times the time taken for the negative electrode structure 10 to move through the pre-lithiation section 1B, and when the time is within the above-described range, impurities remaining in the negative electrode structure may be smoothly removed.

The method of manufacturing a negative electrode of the present invention may further include drying the washed negative electrode structure 10.

Through the drying process, the organic solvent remaining in the negative electrode structure after the impregnation, pre-lithiation, aging, and/or washing processes may be removed.

Specifically, the drying process may be performed by taking the washed negative electrode structure 10 out of the washing bath 2 and introducing the washed negative electrode structure 10 into a separately provided drying part 3. A fixed roll 24 may be disposed between the washing bath 2 and the drying part 3, and the negative electrode structure 10 may move along the fixed roll 24.

The drying process may be performed by air or an inert gas. The inert gas may be at least one selected from the group consisting of Ar, $N_2$, and He.

The drying process may be performed at 10° C. to 80° C., preferably, 20° C. to 60° C., and more preferably, 25° C. to 40° C., and a temperature in this range is preferable in view of preventing the negative electrode structure from being oxidized and maintaining the negative electrode structure in the pre-lithiated state.

The time taken to dry the washed negative electrode structure 10 may be 0.1 times to 5 times, and preferably, 0.5 times to 2 times the time taken for the negative electrode structure 10 to move through the pre-lithiation section, and a time in this range is preferable since the organic solvent remaining in the negative electrode structure may be smoothly removed, and damage to the negative electrode structure which may be caused by the organic solvent remaining in the negative electrode structure for a long time may be prevented.

In the drying part 3, a collecting roll 25 may be installed, and the negative electrode structure 10 that has moved through the drying part 3 may be wound on the collecting roll 25.

The method of manufacturing a negative electrode of the present invention may further include manufacturing a negative electrode by unwinding the negative electrode structure 10 from the collecting roll 25 and cutting the negative electrode structure 10.

The negative electrode may be assembled with a positive electrode, a separator, an electrolyte, and the like as will be described below, and accordingly, a secondary battery, specifically a lithium secondary battery, may be manufactured.

The negative electrode manufactured by the above-described manufacturing method has improved reversibility and improved initial efficiency due to the pre-lithiation and aging processes. Accordingly, the negative electrode manufactured by the manufacturing method of the present invention is preferably applied to a secondary battery, specifically, a lithium secondary battery.

Further, according to the above-described manufacturing method, the electrolyte solution impregnation, pre-lithiation, aging, additional washing, and/or additional drying processes of the negative electrode structure may be performed at one time by a roll-to-roll method, and accordingly, processability in manufacturing a negative electrode may be improved, and quality consistency may also be improved to a superior level.

The secondary battery may include the negative electrode manufactured by the above-described manufacturing method, a positive electrode disposed to face the negative electrode, a separator interposed between the negative electrode and the positive electrode, and an electrolyte. The negative electrode has been described above, and the positive electrode, the separator, and the electrolyte may be used without limitation as long as they are typically used in a lithium secondary battery.

The secondary battery is useful in portable devices such as a mobile phone, a notebook computer, and a digital camera and an electric vehicle field such as a hybrid electric vehicle (HEV).

Further, the secondary battery may be applied to a battery module including the secondary battery as a unit cell or a battery pack including the same.

The battery module or the battery pack may be used as a power supply of a medium-to large-sized device of any one or more of power tools; electric vehicles including electric vehicles (EV), hybrid electric vehicles and plug-in hybrid electric vehicle (PHEV); or systems for power storage.

Hereinafter, examples of the present invention will be described in detail so that those of ordinary skill in the art can easily carry out the present invention. However, the present invention may be embodied in various different forms and is not limited to the examples described below.

EXAMPLES

Example 1: Manufacture of Negative Electrode

<Preparation of Negative Electrode Structure>

A negative electrode active material was prepared by mixing natural graphite (average particle diameter ($D_{50}$): 20 μm) and SiO (average particle diameter ($D_{50}$): 5 μm) in a weight ratio of 70:30.

The negative electrode active material, Denka black as a conductive material, styrene butadiene rubber (SBR) as a binder, and carboxymethylcellulose (CMC) as a thickener were mixed in a weight ratio of 92:3:3.5:1.5 to prepare a negative electrode slurry.

The negative electrode slurry was applied onto both surfaces of a copper current collector (thickness: 8 μm), and the resulting copper current collector was roll-pressed and dried in a 130° C. vacuum oven for 12 hours to form a negative electrode active material layer (thickness: 70 μm) on both surfaces of the copper negative electrode current collector, thereby preparing a negative electrode structure.

The negative electrode structure was wound on a negative electrode roll made of stainless steel and having a diameter of 3 inches (7.62 cm).

<Preparation of Pre-Lithiation Bath>

A pre-lithiation bath made of stainless steel and having a length, width, and height of 100 cm×20 cm×50 cm was prepared. A pre-lithiation solution was introduced into the pre-lithiation bath such that the pre-lithiation solution was filled to 20% of the height of the pre-lithiation bath. The pre-lithiation bath was maintained at a temperature of 25° C.

The pre-lithiation solution was prepared by adding $LiPF_6$ as a lithium salt at a concentration of 1 M to an organic solvent in which ethylene carbonate (EC) and ethyl methyl carbonate (EMC) were mixed in a volume ratio of 30:70 and adding fluoroethylene carbonate (FEC) as an additive at 2 wt % with respect to the total weight of the pre-lithiation solution.

The pre-lithiation bath was partitioned into an impregnation section, a pre-lithiation section, and an aging section. In the impregnation section, the pre-lithiation section, and the aging section, fixed rolls were installed for smooth movement of the negative electrode structure.

In the pre-lithiation section, five pre-lithiation rolls are sequentially arranged on one side of a moving path of the negative electrode structure, and five pre-lithiation rolls are sequentially arranged on the other side of the moving path.

Specifically, each of the pre-lithiation rolls includes a core made of stainless steel (diameter. 3 inches (7.62 cm)), a lithium metal layer having a thickness of 150 μm, and a polypropylene separator layer formed on the lithium metal layer and having a thickness of 15 μm.

In addition, the impregnation section, the pre-lithiation section, and the aging section in the pre-lithiation bath were partitioned in a length ratio of 2:1:2.

<Pre-Lithiation>

The negative electrode structure was introduced into and moved through the pre-lithiation bath at a speed of 1 cm/min while being unwound from the negative electrode roll.

The unwound negative electrode structure entered the impregnation section and was moved therethrough for 40 minutes, thereby impregnating the negative electrode structure with an electrolyte solution.

The negative electrode structure, which had passed through the impregnation section, entered the pre-lithiation section, and was pre-lithiated by electrochemical charging while being pressed by the plurality of pre-lithiation rolls in the process of moving through the pre-lithiation section.

A pressing pressure of the pre-lithiation roll was set to be 30 kg/cm when the negative electrode structure entered the pre-lithiation section, and the pressing pressure of the pre-lithiation roll was set to be 200 kg/cm when the negative electrode structure was passing through the pre-lithiation section. The pressing pressures of the pre-lithiation rolls in contact with the negative electrode structure were proportionally increased as the negative electrode structure moved through the pre-lithiation section.

The pre-lithiation was performed by electrochemically charging the negative electrode structure to 18.5% of the SoC of the negative electrode structure at a current density of 4.68 mA/cm$^2$ using an electrochemical charging and discharging device (WBCS3000 manufactured by WonATech).

The time taken for the negative electrode structure to move through the pre-lithiation section was 20 minutes.

The negative electrode structure, which had passed through the pre-lithiation section, entered the aging section and was moved therethrough for 40 minutes, thereby aging the negative electrode structure.

<Washing and Drying>

A washing bath made of stainless steel and having a length, width, and height of 20 cm×20 cm×50 cm was prepared. A fixed roll was installed between the pre-lithiation bath and the washing bath. The washing bath contained dimethyl carbonate (DMC) as an organic solvent such that DMC was filled to 20% of the height of the washing bath.

The aged negative electrode structure was taken out of the pre-lithiation bath along the fixed roll and introduced into and moved through the washing bath.

The time taken for the negative electrode structure to move through the washing bath was 20 minutes.

A drying part made of stainless steel and having a length, width, and height of 20 cm×20 cm×50 cm was prepared. A temperature of the drying part was 25° C., and the drying part was filled with air. A fixed roll was installed between the washing bath and the drying part. A collecting roll was installed in the drying part.

The washed negative electrode structure was moved through the drying part along the fixed roll, and the time taken for the negative electrode structure to move through the drying part was 20 minutes.

The negative electrode structure that had moved through the drying part was wound on the collecting roll.

Example 2: Manufacture of Negative Electrode

A negative electrode of Example 2 was manufactured in the same manner as in Example 1, except that the pressing pressure of the pre-lithiation roll was set to be 5 kg/cm when a negative electrode structure entered the pre-lithiation section and the pressing pressure of the pre-lithiation roll was set to be 200 kg/cm when the negative electrode structure was passing through the pre-lithiation section.

Example 3: Manufacture of Negative Electrode

A negative electrode of Example 3 was manufactured in the same manner as in Example 1, except that the pressing pressure of the pre-lithiation roll was set to be 150 kg/cm when a negative electrode structure entered the pre-lithiation section and the pressing pressure of the pre-lithiation roll was set to be 200 kg/cm when the negative electrode structure was passing through the pre-lithiation section.

Example 4: Manufacture of Negative Electrode

A negative electrode of Example 4 was manufactured in the same manner as in Example 1, except that the pressing pressure of the pre-lithiation roll was set to be 30 kg/cm when a negative electrode structure entered the pre-lithiation section and the pressing pressure of the pre-lithiation roll was set to be 50 kg/cm when the negative electrode structure was passing through the pre-lithiation section.

Example 5: Manufacture of Negative Electrode

A negative electrode of Example 5 was manufactured in the same manner as in Example 1, except that the pressing pressure of the pre-lithiation roll was set to be 30 kg/cm when a negative electrode structure entered the pre-lithiation section and the pressing pressure of the pre-lithiation roll was set to be 1,500 kg/cm when the negative electrode structure was passing through the pre-lithiation section.

Comparative Example 1: Manufacture of Negative Electrode

A negative electrode of Comparative Example 1 was manufactured in the same manner as in Example 1, except that the separator layer was excluded from the pre-lithiation roll, a pressing process was not performed in pre-lithiation, and a negative electrode structure was electrochemically charged while being spaced 5 mm from the pre-lithiation roll.

Comparative Example 2: Manufacture of Negative Electrode

A negative electrode of Comparative Example 2 was manufactured in the same manner as in Example 1, except that the pressing pressures of the plurality of pre-lithiation rolls were set to be 30 kg/cm.

Comparative Example 3: Manufacture of Negative Electrode

A negative electrode of Comparative Example 3 was manufactured in the same manner as in Example 1, except that the pressing pressure of the pre-lithiation roll was set to be 200 kg/cm when a negative electrode structure entered the pre-lithiation section, the pressing pressure of the pre-lithiation roll was set to be 30 kg/cm when the negative electrode structure was passing through the pre-lithiation section, and the pressing pressures of the pre-lithiation rolls in contact with the negative electrode structure were proportionally reduced as the negative electrode structure moved through the pre-lithiation section.

Comparative Example 4: Manufacture of Negative Electrode

A negative electrode of Comparative Example 4 was manufactured in the same manner as in Example 1, except that only one pre-lithiation roll was disposed on each of both sides of a moving path of a negative electrode structure in the pre-lithiation section, and the pressing pressure was set to be 30 kg/cm.

Experimental Example 1: Evaluation of Capacity Retention Rate

<Manufacture of Lithium Secondary Battery>

Each of the negative electrodes manufactured in Examples 1 to 5 and Comparative Examples 1 and 4 was cut into a size of 3 cm×4 cm.

An aluminum current collector was coated with a positive electrode slurry in which $LiNi_{0.8}Co_{0.1}Mn_{0.1}O_2$ as a positive electrode active material, Super C as a conductive material, and PVDF as a binder were mixed at a weight ratio 97:1.5:1.5, and rolled and dried at 130° C. to manufacture a positive electrode.

A polypropylene separator was interposed between the negative electrode manufactured in each of Examples 1 to 5 and Comparative Examples 1 to 4 and the above-manufactured positive electrode, and an electrolyte was injected to manufacture a lithium secondary battery. The electrolyte was prepared by adding $LiPF_6$ as a lithium salt at a concentration of 1 M to an organic solvent in which ethylene carbonate (EC) and ethyl methyl carbonate (EMC) were mixed in a volume ratio of 30:70 and adding fluoroethylene carbonate (FEC) as an additive at 2 wt % with respect to the total weight of the pre-lithiation solution.

<Evaluation of Capacity Retention Rate>

The discharge capacity and capacity retention rate of each of the lithium secondary batteries manufactured in Examples and Comparative Example were evaluated using an electrochemical charging and discharging device. Charging was performed by applying a current at a current density of 0.1 C-rate up to a voltage of 4.2V, and discharging was performed at the same current density up to a voltage of 2.5V.

The capacity retention rate was evaluated by measuring the discharge capacities of the lithium secondary batteries according to Examples and Comparative Examples at 1st and 100th cycles and substituting the resulting values into Equation 1 below. The results are shown in Table 1 below.

Capacity retention rate (%)=(discharge capacity at 100th cycle/discharge capacity at 1st cycle)×100 [Equation 1]

TABLE 1

|  | Capacity retention rate after 100 cycles (%) |
| --- | --- |
| Example 1 | 95 |
| Example 2 | 93 |
| Example 3 | 92 |
| Example 4 | 92 |
| Example 5 | 90 |
| Comparative Example 1 | 79 |
| Comparative Example 2 | 85 |
| Comparative Example 3 | 83 |
| Comparative Example 4 | 80 |

Referring to Table 1, it can be seen that the negative electrodes according to Examples, in which pressing and pre-lithiation were performed through the plurality of pre-lithiation rolls according to the present invention, and the pressing pressures of the pre-lithiation rolls were increased in a movement direction of the negative electrode structure, exhibited significantly superior performance in lifespan characteristics compared to the negative electrodes according to Comparative Examples.

DESCRIPTION OF REFERENCE NUMERALS

1: pre-lithiation bath
1A: impregnation section
1B: pre-lithiation section
1C: aging section
1D: pre-lithiation solution
2: washing bath
3: drying part
10: negative electrode structure
20: negative electrode roll
21a, 21b, 22, 23a, 23b, and 24: fixed rolls
25: collecting roll
30, 30a, 30b, 30c, 30d, 30a', 30b', 30c', 30d', and 30e': pre-lithiation rolls
31: core
32: lithium metal layer
33: separator layer
37

The invention claimed is:

1. A method of manufacturing a negative electrode, the method comprising:
    preparing a negative electrode roll on which a negative electrode structure is wound, wherein the negative electrode structure comprising a negative electrode current collector and a negative electrode active material layer formed on at least one surface of the negative electrode current collector;
    preparing a pre-lithiation bath comprising a pre-lithiation solution, wherein the pre-lithiation bath is sequentially partitioned into an impregnation section, a pre-lithiation section, and an aging section;
    impregnating the negative electrode structure with the pre-lithiation solution while unwinding the negative electrode structure from the negative electrode roll and moving the negative electrode structure through the impregnation section;
    pre-lithiating the negative electrode structure while moving the negative electrode structure out of the impregnation section and moving the negative electrode structure through the pre-lithiation section; and
    aging the negative electrode structure while moving the negative electrode structure out of the pre-lithiation section and moving the negative electrode structure through the aging section,
    wherein the pre-lithiating of the negative electrode structure comprises:
    (a) arranging a plurality of pre-lithiation rolls, wherein each roll is rotatable and comprises a core, a lithium metal layer formed on the core, and a separator layer formed on the lithium metal layer, in the pre-lithiation section in a movement direction of the negative electrode structure, and
    (b) pre-lithiating the negative electrode structure by electrochemically charging the negative electrode structure while moving the negative electrode structure through the pre-lithiation section, wherein the negative electrode active material layer is in contact with the plurality of pre-lithiation rolls, and pressing the negative electrode structure with the plurality of pre-lithiation rolls, and
    wherein the pressing pressures of the pre-lithiation rolls in contact with the negative electrode structure are increased as the negative electrode structure moves.

2. The method of claim 1, wherein the pressing pressures of the pre-lithiation rolls in contact with the negative electrode structure are proportionally increased as the negative electrode structure moves.

3. The method of claim 1, wherein the pressing pressures of the plurality of pre-lithiation rolls are in a range of 5 kg/cm to 1,600 kg/cm.

4. The method of claim 1, wherein the pressing pressures of the pre-lithiation rolls are in a range of 5 kg/cm to 180 kg/cm when the negative electrode structure enters the pre-lithiation section, and
    the pressing pressures of the pre-lithiation rolls are in a range of 40 kg/cm to 1,600 kg/cm when the negative electrode structure is passing through the pre-lithiation section.

5. The method of claim 1, wherein differences between the pressing pressures of the pre-lithiation rolls when the negative electrode structure enters the pre-lithiation section and the pressing pressures of the pre-lithiation rolls when the negative electrode structure is passing through the pre-lithiation section are in a range of 15 kg/cm to 1,500 kg/cm.

6. The method of claim 1, wherein a time for the negative electrode structure to move through the pre-lithiation section is in a range of 5 minutes to 120 minutes.

7. The method of claim 1, wherein a time for the negative electrode structure to move through the aging section is 0.5 times to 21 times a time for the negative electrode structure to move through the pre-lithiation section.

8. The method of claim 1, wherein a time for the negative electrode structure to move through the impregnation section is 1 time to 10 times a time for the negative electrode structure to move through the pre-lithiation section.

9. The method of claim 1, wherein a temperature of the pre-lithiation bath is in a range of 10° C. to 80° C.

10. The method of claim 1, further comprising washing the aged negative electrode structure by taking the aged negative electrode structure out of the pre-lithiation bath, introducing the aged negative electrode structure into a washing bath comprising an organic solvent, and moving the aged negative electrode structure through the washing bath.

11. The method of claim 10, wherein a time for the aged negative electrode structure to move through the washing bath is 0.1 times to 5 times a time for the negative electrode structure to move through the pre-lithiation section.

12. The method of claim 10, further comprising drying the washed negative electrode structure.

13. The method of claim 12, wherein a time to dry the washed negative electrode structure is 0.1 times to 5 times a time for the negative electrode structure to move through the pre-lithiation section.

14. The method of claim 1, wherein
the negative electrode active material layer comprises a negative electrode active material, and
the negative electrode active material comprises one or more selected from the group consisting of a carbon-based active material and a silicon-based active material.

* * * * *